UNITED STATES PATENT OFFICE.

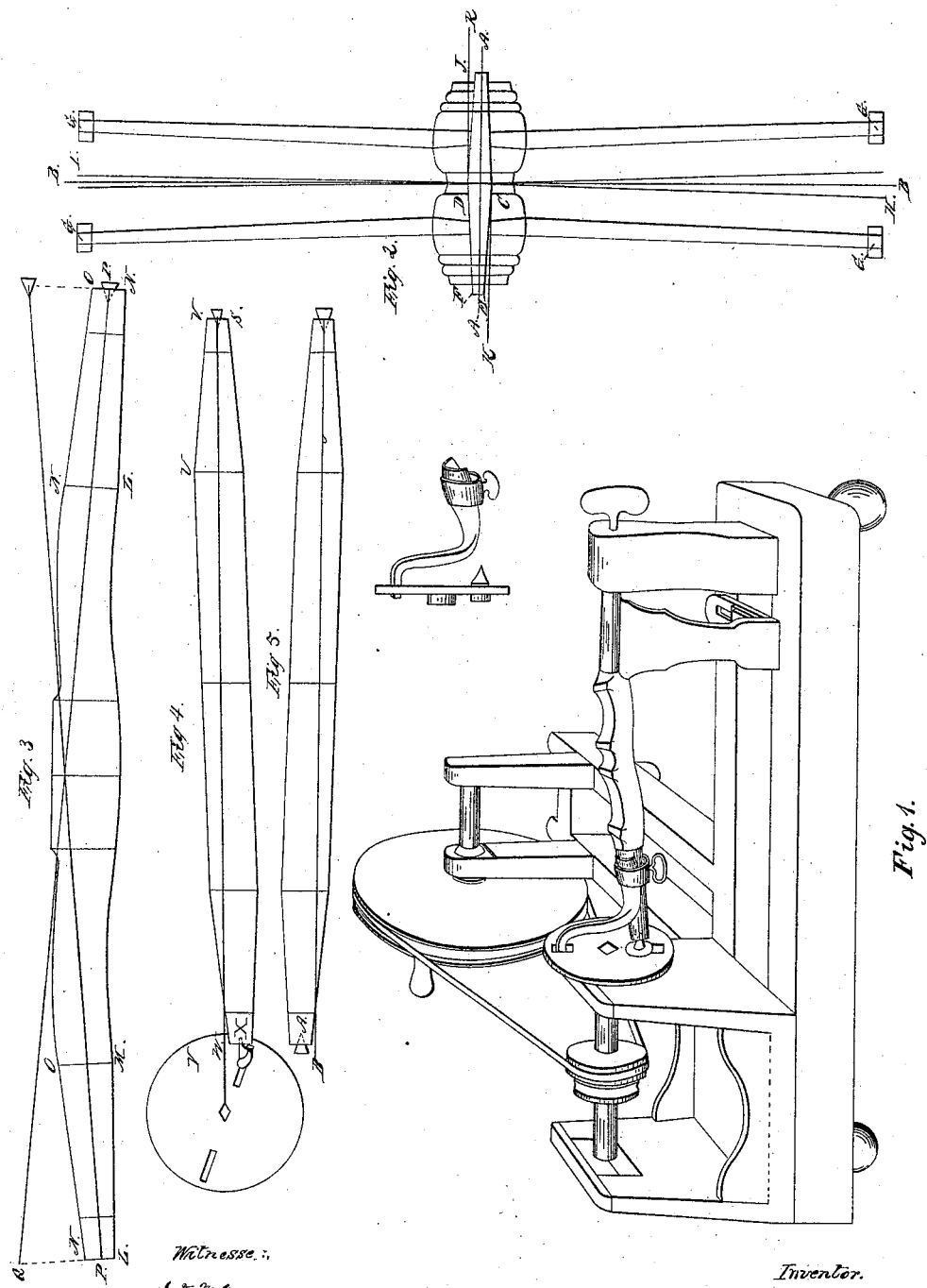

JOHN HENNON, OF BRIGHTON, PENNSYLVANIA.

METHOD OF TURNING CARRIAGE, &c., AXLETREES.

Specification of Letters Patent No. 15,233, dated July 1, 1856.

*To all whom it may concern:*

Be it known that I, JOHN HENNON, of Brighton, in the county of Beaver and State of Pennsylvania, have invented a new and useful mode of turning axles for wagons, carriages, and all similar vehicles, as also an improved principle or rule in obtaining the angles of axles, giving any degree of pitch or gather required; and I do hereby declare that the following is a full, clear, and exact description of the same.

The nature of my invention consists in applying a principle and rule that will give any required degree or angle of spindle to, or of axles, and of so applying the same to the timber as enables me to adjust the same in any common lathe for turning the same, with the greatest possible degree of accuracy.

To enable others skilled in the art, to work by, and use my invention, I will proceed to describe the mode and operation of the same, reference being had to the annexed drawings, making a part of this specification, in which—

Figure 1, is a perspective view of a common lathe in which is represented the position of an axle in turning; Fig. 2, a pair of wheels, representing the mode by the application of the rule and principle of obtaining the pitch, and gather of axle; Fig. 3, represents the application of the rule to the timber for pitch line; Figs. 4 and 5, represent the application of same rule for obtaining gather line.

Fig. 2: Letters A, A, represent a base line on draft board; letters B, B, a line drawn at right angles with the base to work from, set off from center each way on line B, half the size of box C, D, from center or butt of hub, set off on line A, length of hub, at point of hub on line A, set off each way half size of box E, F. Then from center each way mark off half the height of wheels G, G, the distance required to face of wheel set off from line B, or hind end of hub at the felly G. To get the pitch line of wheel, *i. e.*, to say the difference between upper and lower side, suppose a pair of wheels five feet in diameter, and required to be 7 inches wider apart at top than bottom, place a straight edge across the butt end of hub such an angle as will make a difference of three and one half inches in measuring from the felly G, to the straight edge, as at H, and the line drawn from H, to C, is the pitch desired. To obtain the bottom line of spindle apply the outside of square to line H, C, and draw the line from C, to K, which gives under line of spindle. To obtain the gather—suppose a pair of wheels of the height above named and required to be two inches wider behind than before or front— place the straight edge same way above mentioned (for getting pitch line) making the difference between the back and front side, one inch from face of wheel, as at point I, and draw a line from letter D, to I. Then apply outside of square to line D, I, and draw the line D, R, which gives, or is, front line, or side of spindle. To obtain length of axle between shoulders, take twice the distance from pitch line at point H, to face of wheel, which distance deduct from whole width of track, and the balance is the true length between shoulders.

Fig. 3, represents the lines drawn on the stick, or timber for axle, in accordance with the principle or rule described (in Fig. 2) where the outside of square is applied to pitch line H, C, and bottom line C, K, which shows how far the under side of spindle is removed from a straight line, with this exception, viz., that while the point of the spindle is elevated from a straight line in Fig. 2, it is reversed in Fig. 3, but the application of the same rule obtains any required degree of angle. The bottom line of spindle being then obtained as seen in Fig. 3, by lines L, M, set off from under line L, M, size of boxes at point and shoulder which gives line N, O, through the center of which, at point and shoulder, draw the line P, Q, and the distance between the point Q, and the center of spindle at point P, determines the exact distance that the slide point has to be placed from the true center of mandrel in lathe.

Fig. 4: The lines in this draft for obtaining the gather, are found in the same manner precisely as those in draft No. 3, for finding the pitch, viz., by applying the square on lines, letters D, R and D, I, (in Fig. 2) which gives front line of spindle, as represented by the line S, T; then setting off the size of boxes at butt and point, gives points U, and V; through the center of these lines at point and shoulder draw a line to end of axle, which gives the true distance that the end (on its center) is required to be placed from a perpendicular line on the flange, as seen from W to X, maintaining the axle at the same time in a plumb position.

In changing or reversing the axle in the lathe, in order to turn opposite spindle, turn or move the flange till the slide point occupies a similar distance on the opposite side of a perpendicular on the same, as from W, to Y, or as marked on Fig. 5, from A, to B, maintaining the axle, as before stated, in a plumb position.

What I claim as my invention and desire to secure by Letters Patent, is—

The turning of spindles on axles for wagons, carriages, or all other similar vehicles, and the rule or principle of ascertaining the lines on the timber, and of finding the center in accordance therewith, and of so adjusting a movable center, or slide point in any common lathe, giving an axle any desired degree of inclination for the bottom, or pitch line, and at the same time obtaining more or less gather at will, substantially as described.

JOHN HENNON.

Witnesses:
I. D. McCREARY,
G. E. BARNS.